United States Patent
Lee (10) Patent No.: US 6,814,508 B2
(45) Date of Patent: Nov. 9, 2004

(54) METHOD OF AND APPARATUS FOR SETTING AND ADJUSTING A PRINT LOCATION OF A PRINTER

(75) Inventor: Sang-min Lee, Gumi-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 259 days.

(21) Appl. No.: 09/921,001

(22) Filed: Aug. 3, 2001

(65) Prior Publication Data

US 2002/0098026 A1 Jul. 25, 2002

(30) Foreign Application Priority Data

Jan. 20, 2001 (KR) .......................................... 2001-3416

(51) Int. Cl.[7] ................................................ B41J 5/30
(52) U.S. Cl. ............................ 400/61; 400/62; 400/76
(58) Field of Search .............................. 400/61, 62, 70, 400/76

(56) References Cited

U.S. PATENT DOCUMENTS 6,203,220 B1 * 3/2001 Takenoshita et al. .......... 400/61

FOREIGN PATENT DOCUMENTS

| JP | 60217186 A | * | 10/1985 | ............ B41J/21/00 |
|---|---|---|---|---|
| JP | 02173864 A | * | 7/1990 | ............ G06F/15/20 |
| JP | 04126277 A | * | 4/1992 | ............ B41J/19/18 |
| JP | 04250082 A | * | 9/1992 | ............ B41J/21/00 |
| JP | 08-12715 | | 5/1996 | |
| JP | 10224611 A | * | 8/1998 | ............ H04N/1/387 |
| JP | 11-268367 | | 10/1999 | |
| JP | 2000190602 A | * | 7/2000 | ............ B41J/29/46 |

OTHER PUBLICATIONS

"*Notice to Submit response*" issued by Korean Intellectual Property Office dated on Dec. 30, 2002.

* cited by examiner

*Primary Examiner*—Minh Chau
(74) *Attorney, Agent, or Firm*—Robert E. Bushnell, Esq.

(57) ABSTRACT

A method of and an apparatus for setting and adjusting a print location for printing by a printer, by which the information about the print location where a print will start is set by the user as an option and a printer is controlled such that an image or text, etc. to be printed is printed out at a desired position on a paper, is provided. Printing is executed by first setting the print location for printing by a printer set directly by the user and then determining a print starting location considering the set print location information and margin information related to a document. Thus, a document having the same margins can be printed for various applications. Furthermore, a desired portion of text or image data, for example, can be printed out at a designated position on a printing paper by scaling up or down a document.

26 Claims, 6 Drawing Sheets

METHOD OF AND APPARATUS FOR SETTING AND ADJUSTING A PRINT LOCATION OF A PRINTER

CLAIM OF PRIORITY

This application makes reference to, incorporates the same herein, and claims all benefits accruing under 35 U.S.C. §119 from my application METHOD FOR SETTING AND CONTROLLING PRINTING POSITION OF THE PRINTER filed with the Korean Industrial Property Office on Jan. 20, 2001 and there duly assigned Serial No. 3416/2001.

BACKGROUND OF THE INVENTION

1. Field of the Invention

The present invention relates to a method of controlling a printer, and more particularly, to a method of setting and adjusting the print location of a printer, by which information about a print location of a printer to identify where printing will start is set as an option by a user, and a printer is controlled such that a document is printed out according to the set print location information.

2. Description of the Related Art

Generally, a printer is used in combination with a computer. After having received print setup information and print data transferred from the computer, the printer runs a built-in printer drive program and controls printing such that print data is printed on a paper loaded according to the print setup information. For a user to change a location for printing on a paper, a document margin setup function has been used.

However, a shortcoming of a printer according to conventional art is that it is difficult to produce prints of a standardized format. Furthermore, it is difficult for a user to accurately determine a print location when using a document margin setting function. Conventional printers typically have a problem with respect to accurately printing a portion of a text or image which a user desires to print on a paper by scaling up or down a document.

SUMMARY OF THE INVENTION

To solve the above problems, it is an objective, among other objectives, of the present invention to provide a method of setting and adjusting a print location of a printer, by which a user directly defines the print location for printing by the printer and the printer is controlled such that an image or text, for example, to be printed is printed out exactly at a desired position on a paper using information about the defined print location and margins.

To achieve the above objective, and other objectives, of the present invention, a method of setting the print location for printing by a printer is provided. The method includes the steps of: (a) determining whether or not a print location setting command of the printer is input; (b) outputting a print location setting menu screen for setting the print location for printing by the printer when the print location setting command is input; (c) inputting print location information in the print location setting menu screen by using an input means; and (d) storing the print location information entered in the step (c) in a memory.

The present invention also provides a method of adjusting the print location for printing by a printer. The method of adjusting the print location for printing by a printer includes the steps of: (a) receiving printer print location information about a print location for printing by a printer and margin information about margins for printing from a computer of a user communicating with the printer; (b) determining a print location for printing on a paper or printing medium loaded on the printer using the printer print location information and the margin information; and (c) controlling the position of a printer head for the printer according to the print location for printing determined in the step (b).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF THE INVENTION

Figure 1:
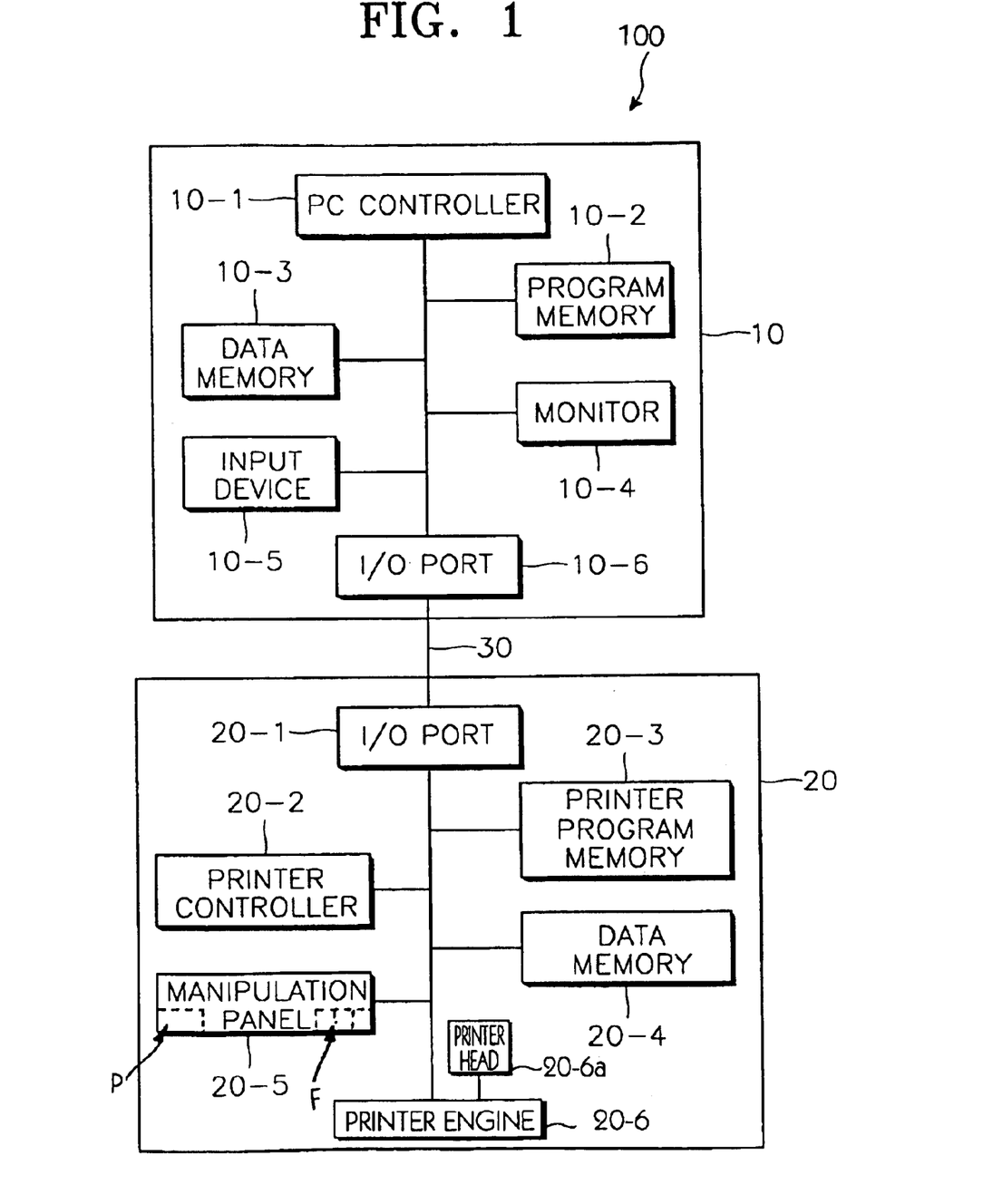
FIG. 1 illustrates a configuration of a printer system to which the present invention is applied.

Referring now to FIG. 1, a printer system 100, to which the present invention is applied, includes a computer 10, a printer 20, and a connector 30, connector 30 coupling the computer 10 to the printer 20 for communication of data, instructions and program information, for example. More specifically, the computer 10 includes a personal computer (PC) controller 10-1, a program memory 10-2, a data memory 10-3, a monitor 10-4, an input device 10-5, and an input/output (I/O) port 10-6. The printer 20 includes an I/O port 20-1, a printer controller 20-2, a printer program memory 20-3, a data memory 20-4, a manipulation panel 20-5 that includes a power key P of the printer 20 and various function keys F corresponding to various functions for the printer 20, and a printer engine 20-6 including a printer head 20-6a. The connector 30 couples input/output port 10-6 of the computer 10 with input/output port 20-1 of the printer 20.

The typical operation of the printer 20 will now be described. Various word processor programs and graphic programs stored in the program memory 10-2 are executed by the PC controller 10-1 of the computer 10, so as to create file data. Then, when a print start command is selected by the user after the type of paper and margins, for example, are determined, printer control data containing information such as the type of paper and margins stored in the data memory 10-3 and the file data to be printed are transmitted to the printer 20 through the I/O port 10-6 and the connector 30.

Then, the printer controller 20-2 of the printer 20 stores the printer control data and the file data to be printed transmitted through the I/O port 20-1 in the data memory 20-4. The printer controller 20-2 runs a printer operating program stored in the printer program memory 20-3 so that the transmitted file data can be printed according to the setting conditions of information about the type of paper and margins contained in the printer control data, so as to execute printing by controlling the printer engine 20-6.

Figure 2:
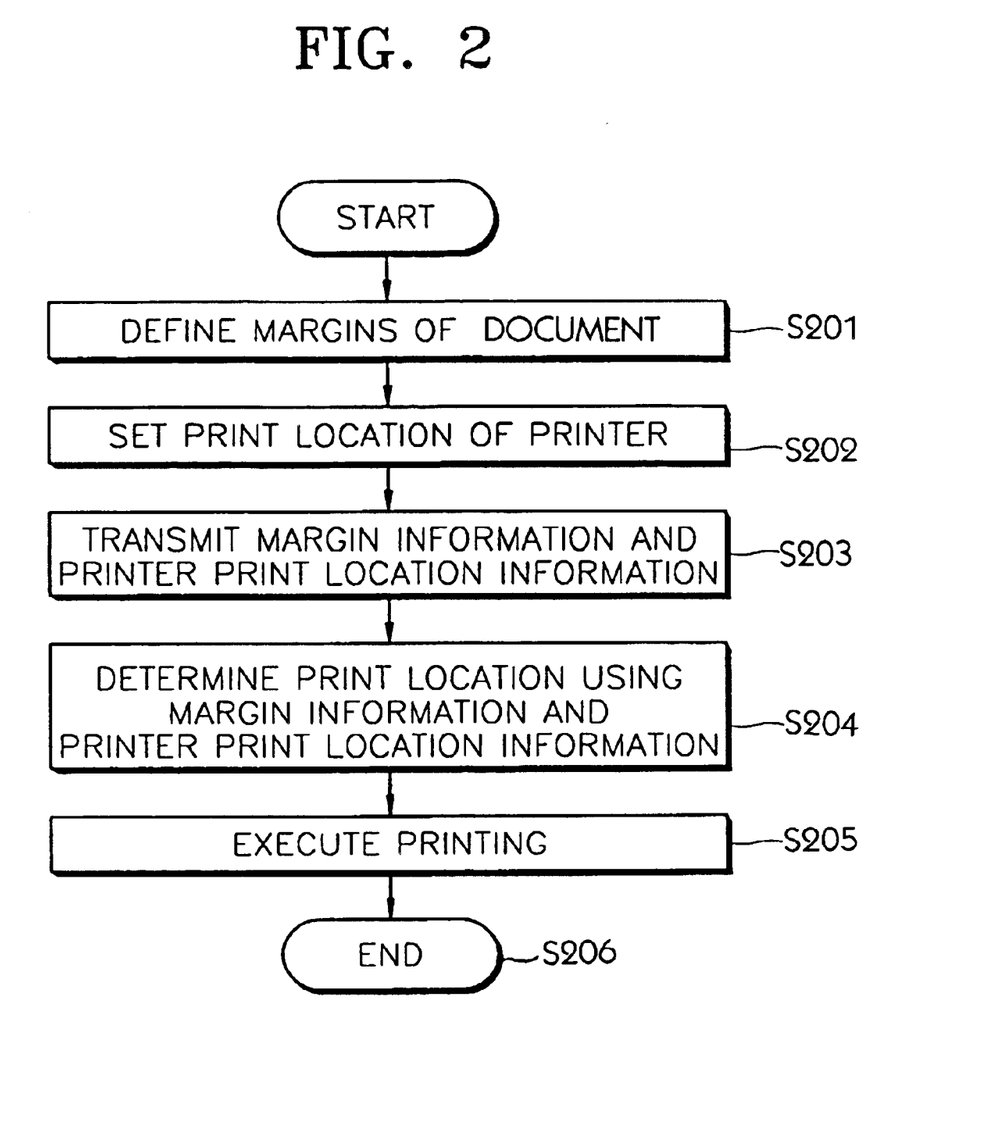
FIG. 2 is a flowchart illustrating a method of setting and adjusting the print location for printing by a printer according to the present invention.

Referring now to FIGS. 2 through 5B, a method of setting and adjusting the print location for printing by the printer 20 according to the present invention executed on the printer system 100 of FIG. 1 will now be described. Referring first to FIG. 2, the user of computer 10 in printer system 100, for example, drives a word processor or graphic program by means of the input device 10-5, such as including a keyboard and a mouse, to create a document or a graphic file. Then, before starting of printing of the created file, the user specifies or defines margins for the document to be printed by means of the input device 10-5 and stores the specified margins in the data memory 10-3 at step S201. In the event that the specified margins of the document make no change in the course of creating the file, the margins defined as an initial value are maintained.

The user then specifies the print location for printing by the printer 20 using a printer control program stored in the program memory 10-2 at step S202. The process of setting the print location or printing by the printer 20 performed in step S202 will now be described in detail with reference to FIG. 3.

Figure 3:
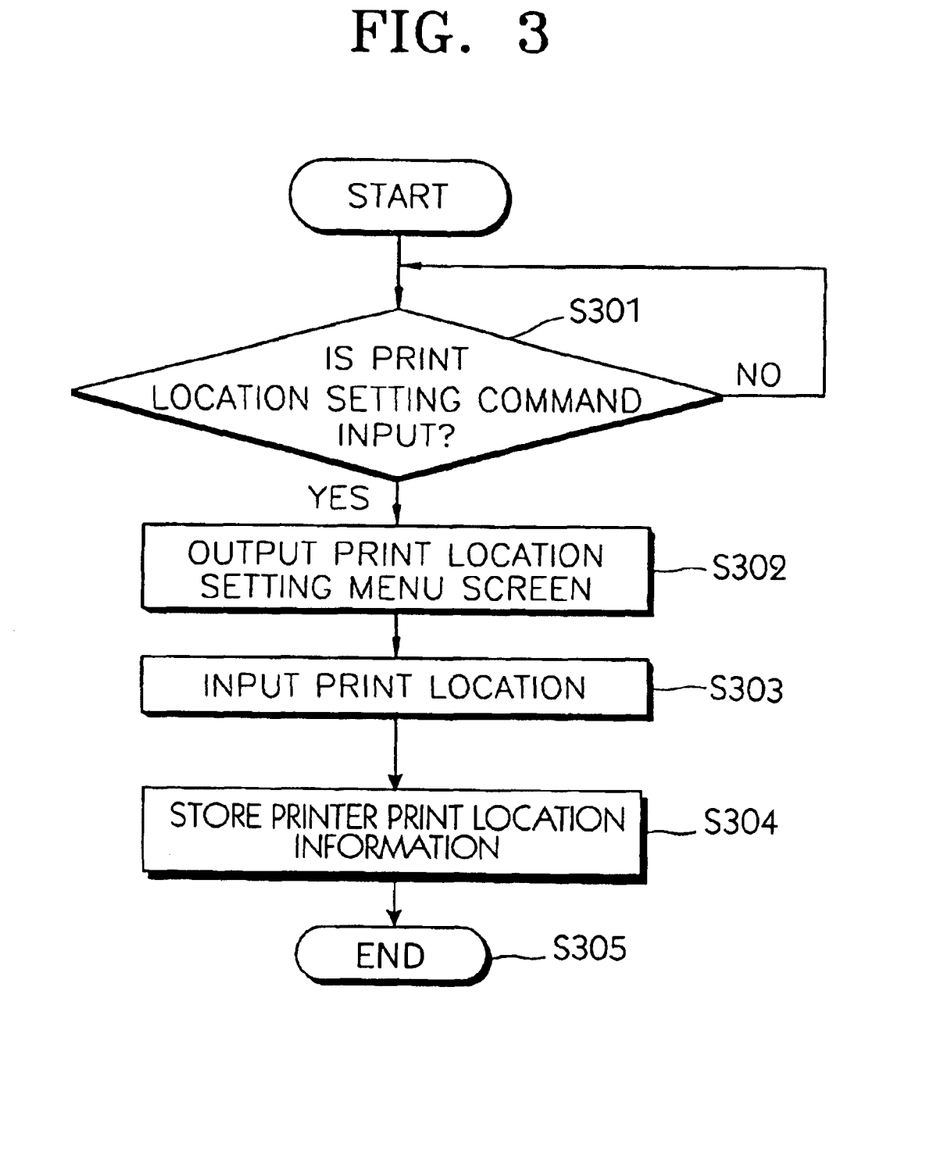
FIG. 3 is a detailed flowchart illustrating a process of setting the print location shown in FIG. 2.
Figure 5A:
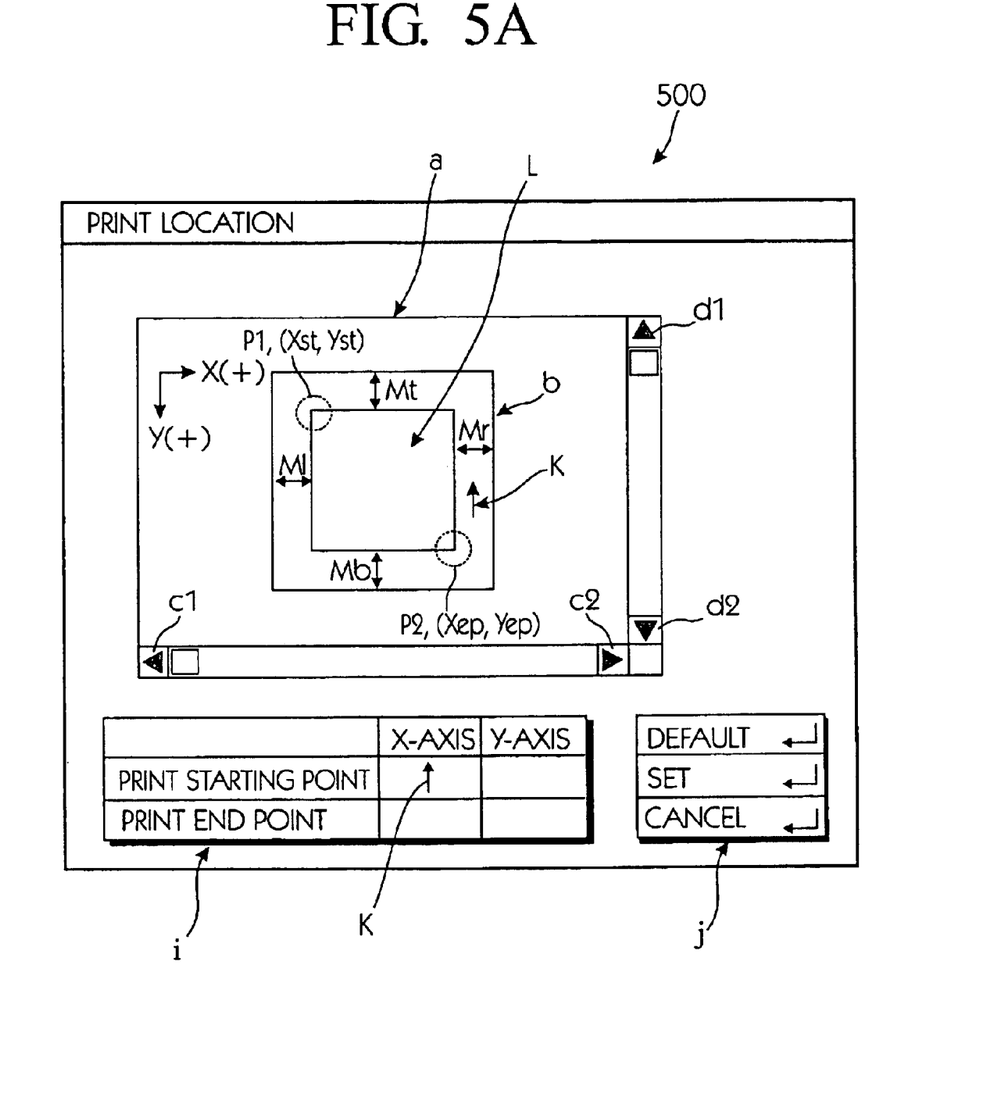
FIG. 5A is a detailed configuration illustrating a print location setting menu screen for setting the print location for printing by the printer according to the present invention.

Referring now to FIG. 3, in setting the print location for printing by the printer 20 (step S202), it is determined whether or not the print location setting command of the printer 20 for setting a printer location for printing is input to the PC controller 10-1 such as by manipulating keys of the input device 10-5 at step S301. If the print location setting command of the printer 20 is input to the PC controller 10-1, the process proceeds to step S302 and the PC controller 10-1 runs the printer control program stored in the program memory 10-2 and outputs to the monitor 10-4 a print location setting menu screen 500 for the user to set the print location as illustrated in FIG. 5A at step S302. If the print location setting command is not input to the PC controller 10-1, the process waits at step S301.

Figure 5B:
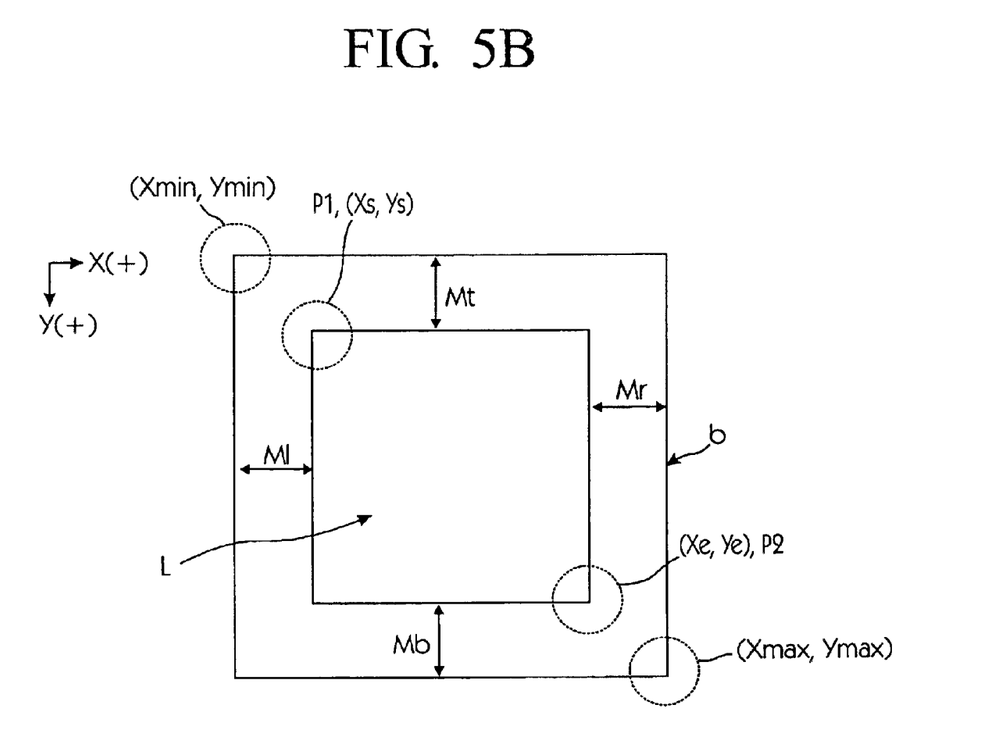
FIG. 5B is a diagrammatic illustration of a print boundary screen in the print location setting menu screen of FIG. 5A for illustrating the process of determining the print location of FIG. 4.

Continuing with reference to FIGS. 3, 5A and 5B, as shown in FIG. 5A, the print location setting menu screen 500 includes an input window i for the user to directly specify X-axis and Y-axis coordinate values of a print starting point P1 and a print end point P2. An edge boundary screen a for displaying edge boundary screen information of a printing medium, such as a printing paper, and a print boundary screen b for printing by the printer 20 for displaying print boundary screen information including, for example, a print location area L for printing, margin information for printing, the margin information including a top margin Mt, a bottom margin Mb, a left margin Ml and a right margin Mr, and a printing starting point P1 and a printing end point P2 including coordinate information or location information for P1, P2, are displayed together on print location setting menu screen 500 such that the print boundary screen b for printing by the printer 20 is automatically changed according to the print starting point P1(Xst, Yst) and the print end point P2(Xep, Yep) input by the user. Alternatively, using print location adjustment cursors c1, c2, d1, and d2, the print location area L can move up and down and from side to side by checking changes of the print location area L. Furthermore, the print location setting menu screen 500 includes use of a key input program by printer controller 20-2 stored in a printer program memory 20-3 for returning to the print location area L set as default values, with window j of print location input screen 500 as a cursor input window for use by the user in relation to setting or cancelling default values for the print location area or margins by using an input means, such as a mouse of input device 10-5. Thus, when the user determines print location information by using the print location adjustment cursors c1, c2, d1, and d2 or by using the input window i and positions the cursor K and clicks using a mouse of input device 10-5, for example, on a set portion of the input window i or the print boundary screen b to input print location information at step S303, the PC controller 10-1 stores the printer print location information set by the user in the data memory 10-3 at step S304, and the process then proceeds to END step S305. The process of setting the print location of the printer 20 in step S202 is therefore executed in this way, for example.

Continuing with reference to FIG. 2, when a print command is input by means of the input device 10-5 after designating a file to be printed, information about the print location of the printer 20 set by the user in step S202 and information about margins set during the creation of the file to be printed are transmitted to the I/O port 20-1 of the printer 20 through the I/O port 10-6 and the connector 30 at step S203. In this case, the file data to be printed is also transmitted to the printer 20 together with the margin information and printer print location information.

Figure 4:
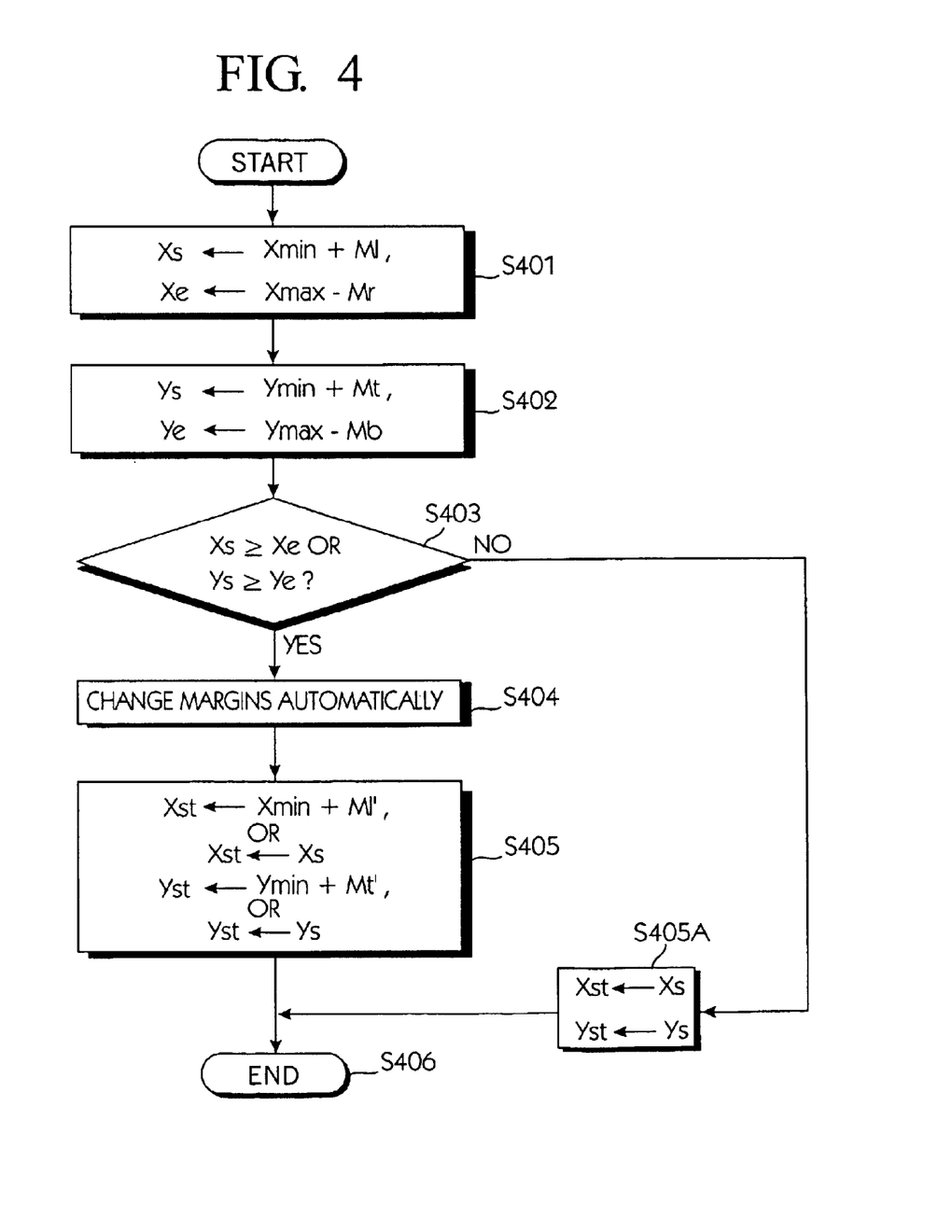
FIG. 4 is a detailed flowchart illustrating a process of determining the print location shown in FIG. 2.

After storing the file data to be printed, the margin information, and the printer print location information in the data memory 20-4, the printer controller 20-2 runs the printer operating program stored in the printer program memory 20-3 and executes a process of determining the print location of a paper loaded on the printer 20 using the printer print location information and the margin information in step S204 that has been stored in the data memory 20-4. One embodiment for determining the print location is illustrated in FIG. 4. The process of determining the print location by the printer controller 20-2 using the printer operating program stored in the printer program memory 20-3 and using the printer print location information and the margin information in data memory 20-4 in step S204 shown in FIG. 2, will now be described with reference to FIGS. 4 and 5B.

FIG. 5B illustrates diagrammatically the print boundary screen b of print location setting menu screen 500 of FIG. 5A with reference to a positive X-axis direction and a positive Y-axis direction with respect to the X and Y axis coordinates for the X-axis minimum value Xmin, the Y-axis minimum value Ymin, the X-axis maximum value Xmax and the Y-axis maximum value Ymax in relation to the X and Y axis coordinates system, as illustrated in FIG. 5B. Also, in the diagrammatic illustration of the print boundary screen b in FIG. 5B there is illustrated in relation to the X and Y coordinate system the X and Y coordinates respectively for the X-axis lower limit Xs and the Y-axis lower limit Ys corresponding to the print starting point P1, and the X and Y axis coordinates respectively corresponding to an X-axis upper limit Xe and a Y-axis upper limit Ye corresponding to the print end point P2, in accordance with the process set forth in FIG. 4. The top margin Mt, the bottom margin Mb, the right margin Mr and the left margin Ml illustrated in FIG. 5B, as well as in FIG. 5A, are positive values or absolute values of the distance measurement of these margins respectively in the X-axis direction and in the Y-axis direction, with the right margin Mr and the left margin Ml being a measurement of a corresponding distance in the X-axis direction, and with the top margin Mt and the bottom margin Mb respectively being a measurement of a distance in the Y-axis direction.

Referring now to FIGS. 4 and 5B, in step S204 an X-axis lower limit Xs, which is a result of adding a left margin Ml contained in the margin information to an X-axis minimum value Xmin contained in the printer print location information, and an X-axis upper limit Xe, which is a result of subtracting a right margin Mr contained in the margin information from an X-axis maximum value Xmax contained in the printer print location information, are each determined, such as by being calculated at step S401. For example, with reference to FIG. 5B and step S401 in FIG. 4, for example, when the X-axis and Y-axis coordinates for Xmin and Ymin are set at (0, 0) with respect to the X and Y positive coordinate system illustrated in FIG. 5B and the left margin Ml and the right margin Mr each have a positive or absolute value distance measure along the X-axis of 1, applying step S401, Xs is equal to Xmin+Ml or Xs equals 0+1=1 as the X-axis coordinate for Xs. Likewise, assuming the X-axis and Y-axis coordinate values for Xmax and Ymax, for example, are (6, 6), then Xe=Xmax−Mr or Xe=6−1=5 as the X-axis coordinate for Xe.

Continuing with reference to FIGS. 4 and 5B, a Y-axis lower limit Ys, which is a result of adding a top margin Mt contained in the margin information to an Y-axis minimum value Ymin contained in the printer print location information, and an Y-axis upper limit Ye, which is a result of subtracting a bottom margin Mb contained in the margin information from an Y-axis maximum value Ymax contained in the printer print location information, are each determined, such as by being calculated at step S402. Continuing with the previous example from step S401, referring to step S402 and FIG. 5B, when the X-axis and Y-axis coordinate values of Xmin and Ymin are (0, 0) and the X-axis and Y-axis coordinate values of Xmax and Ymax are (6, 6), for example, and with the positive or absolute value distance along the Y-axis of the top margin Mt and the bottom margin Mb each being a value of 1, applying step S402 of FIG. 4, the Y-axis coordinate value of Ys=Ymin+Mt which equals 0+1=1, and the Y-axis coordinate value of Ye=Ymax−Mb which equals 6−1=5. Therefore, in the example, the X-axis and Y-axis coordinates of Xs and Ys are (1, 1) and the X-axis and Y-axis coordinates of Xe and Ye are (5, 5). The coordinate values for Xs and Ys and Xe and Ye respectively determined from steps S401 and S402 will now be used in the comparison step S403 to determine whether the print location value, such as for the print starting point P1 and the print end point P2 will require adjustment. Continuing with step S403 in FIG. 4, then, the X-axis lower limit Xs and the X-axis upper limit Xe determined in step S401 are compared with each other at step S403, and the Y-axis lower limit Ys and the Y-axis upper limit Ye determined in step S402 are compared with each other at step S403.

When, as a result of the comparison at step S403, the X-axis lower limit Xs is greater than or equal to the X-axis upper limit Xe or when the Y-axis lower limit Ys is greater than or equal to the Y-axis upper limit Ye, the process or processes of automatically changing a respective one or more of the left, right, top or bottom margins are performed at step S404; and when not, the process proceeds to END at step S406 through step S405A where the X-axis lower limit Xs and the Y-axis lower limit Ys are respectively determined as the X-axis and Y-axis coordinates of the print starting point P1 (Xst, Yst). That is, in the event that the defined margins and print location value as the print starting point, are used when the X-axis lower limit Xs is greater than or equal to the X-axis upper limit Xe or when the Y-axis lower limit Ys is greater than or equal to the Y-axis upper limit Ye, printable area does not exist for printing on a print medium, such as paper. Thus, the above problem can be advantageously solved by changing the margin information to provide a corresponding print location value to that specified by the user.

Continuing with reference to FIG. 4, the process of automatically changing the margins in step S404 is a process, for example, that is programmed in the operating program stored in the printer program memory 20-3 and the printer controller 20-2 executes the operating program using the printer print location information and margin information stored in data memory 20-4 according to a predetermined rule or predetermined operation such that the right, left, top and bottom margins can be automatically initialized, for example, to a respective initial value or a respective zero position for each of the respective top, bottom, right and left margins according to the predetermined rule or predetermined operation in the operating program stored in the printer program memory 20-3 for setting such initial value or zero position by adjusting X-axis and Y-axis coordinate values defining the respective margins, for each of the respective top, bottom, right and left margins, Mt, Mb, Mr, and Ml. Such zero position or initialized margin values providing appropriate corresponding distances for the margins Mt, Mb, Ml and Mr are measured in the respective X-axis and Y-axis directions, by execution of a predetermined rule in the operating program for the printer 20 to adjust X-axis and Y-axis coordinate positions for the respective margins, such as to provide for the conditions Xe≧Xs and Ye≧Ys with respect to step S403 of FIG. 4 being satisfied. Alternatively, the predetermined rule in the operating system can adjust the respective distances for the respective margins Ml, Mr, Mt, and Mb by adjusting X-axis, and Y-axis coordinate positions defining the margins, so that a position, other than an initialized position, can be provided for the margins, but also satisfying the criteria Xe≧Xs and Ye≧Ys with respect to step S403 of FIG. 4. Furthermore, as another example, the process of determining the print location shown in FIG. 4 for printing by the printer 20 on a print medium, such as paper, can be programmed in the operating program stored in the printer program in memory 20-3 and the printer controller 20-2 executes the operating program such that the process flow returns from step S404 to step S401 by reducing the right, left, top and bottom margins at a constant ratio to repeat the above steps S401 through S404 until the right, left, top and bottom margins are found to be acceptable in accordance with the above discussed criteria Xe≧Xs and Ye≧Ys with respect to step S403, and the process, in such case, then proceeds to END step S406 through step S405A where the X-axis lower limit Xs and the Y-axis lower limit Ys, finally determined from such repeating of steps S401 and S402, are determined as the coordinates of the print starting point P1 (Xst, Yst).

Continuing with reference to FIG. 4, after having performed the process of automatically changing the margins during step S404, the process, proceeds to step S405 where a print starting point P1 is determined as X-axis and Y-axis coordinate values Xst, Yst, according to the formulas set forth in step S405. The X-axis print starting point coordinate value Xst is determined in step S405 by adding a left margin Ml' determined from step S404 to the X-axis minimum value Xmin. The Y-axis print starting point coordinate value Yst is determined in step S405 by adding the Y-axis minimum value Ymin to the top margin Mt' determined in step S404. However, in the "OR" relation of step S403, on the other hand, when the X-axis lower limit Xs is less than the X-axis upper limit Xe, the X-axis lower limit Xs determined in step S401 can be determined as the X-axis coordinate Xst of the print starting point P1 in step S405. Also, when the Y-axis lower limit Ys is less the Y-axis upper limit Ye, the Y-axis lower limit Ys determined in the step S402 can be determined as the Y-axis coordinate Yst of the print starting point P1 in step S405. After the print starting point P1 (Xst, Yst) has been determined in step S405, the process proceeds to END step S406.

Continuing with reference to FIG. 2, after having determined the print location through the above described process of FIG. 4 and step S204 of FIG. 2, the process proceeds to step S205 of FIG. 2 where the print controller 20-2 controls the position of the printer head 20-6a of the printer engine 20-6 according to the print location information and margin information, such as P1, P2, Mt, Mt', Mb, Mr, Ml and Ml', determined in step S204 such that the transmitted file data is printed out at a desired position on the loaded print medium, such as a paper, at step S205. The process then proceeds to END step S206. In this way, use of the margin information about the file to be printed and the printer print location information set by the user allows the user to print an image or text, etc. to be printed exactly at a desired position on a print medium, such as a paper.

The present invention can be implemented in terms of a method, an apparatus, a system, and the like. When the present invention is implemented in software, the elements of the present invention are code segments, for example. Programs or code segments can be stored on a processor-readable recording medium, or can be transmitted by a computer data signal combined with a carrier wave over a transmission medium or a communication network, for example. Examples of the processor-readable medium can include a electronic circuit, a semiconductor memory device, a read only memory (ROM), a flash memory, an erasable ROM (EROM), a floppy disk, an optical disk, a hard disk, an optical fiber medium, air, an electromagnetic field, and a radio frequency (RF) network. The computer data signal can include any of signals that can be transmitted over a transmission medium, such as an electronic network channel, an optical fiber, air, an electromagnetic field, and an RF network.

As described above, according to the present invention, printing is executed by first setting the print location for printing by a printer set directly by the user and then determining a print starting location considering the set print location information and margin information related to a document. Thus, the present invention advantageously allows various applications for printing a document having the same margins. Furthermore, the present invention allows a desired portion of text data or image data, for example, to be printed out at a designated position on a printing medium, such as printing paper, by scaling up and down a document.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for setting a print location for printing by a printer, comprising the steps of:

determining whether a print location setting command for setting the print location for printing by the printer is input;

outputting a print location setting menu screen for setting the print location for printing by the printer when the print location setting command is input;

inputting print location information for setting the print location for printing by the printer for entry in the print location setting menu screen;

storing the input print location information entered in the print location setting menu screen in a memory; and adjusting the print location for printing by the printer by determining the print location for printing on a printing medium using the print location information and margin information;

wherein the print location is determined by comparing an X-axis lower limit Xs with an X-axis upper limit Xe, and by comparing a Y-axis upper limit Ye with a Y-axis lower limit Ys.

2. The method of claim 1, the print location setting menu screen comprising an input window for inputting at least coordinate information about a starting point and an end point of the print location for setting the print location for printing by the printer.

3. The method of claim 2, the print location setting menu screen further comprising a cursor input window for setting the print location information to default values.

4. The method of claim 3, the print location setting menu screen being programmed such that edge boundary screen information for a printing medium and print boundary screen information for a print location area for printing on the printing medium are displayed together on the print location setting menu screen, with the print boundary screen information being changed according to the input print location information.

5. The method of claim 4, the print location setting menu screen being programmed such that the print boundary screen information is respectively changed in X-axis and Y-axis directions by using a print location adjustment cursor.

6. The method of claim 1, the print location setting menu screen further comprising a cursor input window for setting the print location information to default values.

7. The method of claim 1, the print location setting menu screen being programmed such that edge boundary screen information for the printing medium and print boundary screen information for a print location area for printing on the printing medium are displayed together on the print location setting menu screen, with the print boundary screen information being changed according to the input print location information.

8. The method of claim 7, the print location setting menu screen being programmed such that the print boundary screen information is respectively changed in X-axis and Y-axis directions by using a print location adjustment cursor.

9. The method of claim 1, wherein the step of adjusting the print location for printing by the printer further comprises the steps of:

receiving the print location information about the print location for printing on the printing medium by the printer and the margin information about margins for printing on the printing medium from a computer; and controlling the position of a printer head for printing on the printing medium according to the determined print location.

10. The method of claim 9, wherein the print location is determined by the steps of:

determining an X-axis lower limit Xs by adding a left margin value Ml contained in the margin information to an X-axis minimum value Xmin contained in the print location information, and determining an X-axis upper limit Xe by subtracting a right margin value Mr contained in the margin information from an X-axis maximum value Xmax contained in the print location information;

determining a Y-axis lower limit Ys by adding a top margin value Mt contained in the margin information to a Y-axis minimum value Ymin contained in the print location information, and determining a Y-axis upper limit Ye by subtracting a bottom margin value Mb contained in the margin information from an Y-axis maximum value Ymax contained in the print location information;

comparing the X-axis lower limit Xs with the X-axis upper limit Xe and comparing the Y-axis upper limit Ye with the Y-axis lower limit Ys, respectively;

selectively changing the margins respectively according to a predetermined rule when any of the X-axis lower limit Xs is greater than or equal to the X-axis upper limit Xe and the Y-axis lower limit Ys is greater than or equal to the Y-axis upper limit Ye; and determining the X-axis lower limit Xs and the Y-axis lower limit Ys as the respective X-axis and Y-axis coordinate values of a print starting point Xst, Yst when the X-axis lower limit Xs is less than the X-axis upper limit Xe and when the Y-axis lower limit Ys is less the Y-axis upper limit Ye, and when the X-axis lower limit Xs is greater than or equal to the X-axis upper limit Xe, determining an X-axis coordinate value Xst of the print starting point by adding the X-axis minimum value Xmin to a changed left margin value Ml' determined in the selectively changing the margins step, and when the Y-axis lower limit Ys is greater than or equal to the Y-axis upper limit Ye determining a Y-axis coordinate value Yst of the print starting point by adding the Y-axis minimum value Ymin to a changed top margin value Mt' determined in the selectively changing the margins step, respectively.

11. The method of claim 10, wherein, when any of the X-axis lower limit Xs is greater than or equal to the X-axis upper limit Xe and the Y-axis lower limit Ys is greater than or equal to the Y-axis upper limit Ye, the margins are initialized to a zero position according to the predetermined rule.

12. A method of adjusting a print location for printing by a printer, comprising the steps of:

receiving print location information about a print location for printing on a printing medium by the printer and margin information about margins for printing on the printing medium from a computer;

determining the print location for printing on the printing medium using the print location information and the margin information; and controlling the position of a printer head for printing on the printing medium according to the print location determined in the step for determining the print location;

wherein the step for determining the print location comprises the steps of:

determining an X-axis lower limit Xs by adding a left margin value Ml contained in the margin information to an X-axis minimum value Xmin contained in the print location information, and determining an X-axis upper limit Xe by subtracting a right margin value Mr contained in the margin information from an X-axis maximum value Xmax contained in the print location information;

determining a Y-axis lower limit Ys by adding a top margin value Mt contained in the margin information to a Y-axis minimum value Ymin contained in the print location information, and determining a Y-axis upper limit Ye by subtracting a bottom margin value Mb contained in the margin information from an Y-axis maximum value Ymax contained in the print location information;

comparing the X-axis lower limit Xs with the X-axis upper limit Xe and comparing the Y-axis upper limit Ye with the Y-axis lower limit Ys, respectively;

selectively changing the margins respectively according to a predetermined rule when any of the X-axis lower limit Xs is greater than or equal to the X-axis upper limit Xe and the Y-axis lower limit Ys is greater than or equal to the Y-axis upper limit Ye; and determining the X-axis lower limit Xs and the Y-axis lower limit Ys as the respective X-axis and Y-axis coordinate values of a print starting point Xst, Yst when the X-axis lower limit Xs is less than the X-axis upper limit Xe and when the Y-axis lower limit Ys is less than the Y-axis upper limit Ye, and when the X-axis lower limit Xs is greater than or equal to the X-axis upper limit Xe, determining an X-axis coordinate value Xst of the print starting point by adding the X-axis minimum value Xmin to a changed left margin value Ml' determined in the selectively changing the margins step, and when the Y-axis lower limit Ys is greater than or equal to the Y-axis upper limit Ye determining a Y-axis coordinate value Yst of the print starting point by adding the Y-axis minimum value Ymin to a changed top margin value Mt' determined in the selectively changing the margins step, respectively.

13. The method of claim 12, wherein, when any of the X-axis lower limit Xs is greater than or equal to the X-axis upper limit Xe and the Y-axis lower limit Ys is greater than or equal to the Y-axis upper limit Ye, the margins are initialized to a zero position according to the predetermined rule.

14. An apparatus for setting a print location for printing by a printer, comprising:

means for determining whether a print location setting command for setting the print location for printing by the printer is input;

means for outputting a print location setting menu screen for setting the print location for printing by the printer when the print location setting command is input;

means for inputting print location information for setting the print location for printing by the printer and for entering the input print location in formation in the print location setting menu screen;

means for storing the input print location information entered in the print location setting menu screen; and means for adjusting the print location for printing by the printer by determining the print location for printing on a printing medium using the print location information and margin information;

wherein the print location is determined by comparing an X-axis lower limit Xs with an X-axis upper limit Xe, and by comparing a Y-axis upper limit Ye with a Y-axis lower limit Ys.

15. The apparatus of claim 14, the print location setting menu screen comprising an input window for inputting at least coordinate information about a starting point and an end point of the print location for setting the print location for printing by the printer.

16. The apparatus of claim 15, the print location setting menu screen further comprising a cursor input window for setting the print location information to default values.

17. The apparatus of claim 16, the print location setting menu screen being programmed such that edge boundary screen information for the printing medium and print boundary screen information for a print location area for printing on the printing medium are displayed together on the print location setting menu screen, with the print boundary screen information being changed according to the input print location information.

18. The apparatus of claim 17, the print location setting menu screen being programmed such that the print boundary screen information is respectively changed in X-axis and Y-axis directions by using a print location adjustment cursor.

19. The apparatus of claim 14, the print location setting menu screen further comprising a cursor input window for setting the print location information to default values.

20. The apparatus of claim 14, the print location setting menu screen being programmed such that edge boundary screen information for a printing medium and print boundary screen information for a print location area for printing on the printing medium are displayed together on the print location setting menu screen, with the print boundary screen information being changed according to the input print location information.

21. The apparatus of claim 20, the print location setting menu screen being programmed such that the print boundary screen information is respectively changed in X-axis and Y-axis directions by using a print location adjustment cursor.

22. The apparatus of claim 14, wherein said means for adjusting the print location for printing by the printer comprises:
   means for receiving the print location information about the print location for printing on the printing medium by the printer and margin information about margins for printing on the printing medium from a computer;
   means for determining the print location for printing on the printing medium using the print location information and the margin information; and
   means for controlling the position of a printer head for printing on the printing medium according to the print location determined by the means for determining the print location.

23. The apparatus of claim 22, the means for determining the print location comprising:
   means for determining an X-axis lower limit Xs that adds a left margin value Ml contained in the margin information to an X-axis minimum value Xmin contained in the print location information, and means for determining an X-axis upper limit Xe that subtracts a right margin value Mr contained in the margin information from an X-axis maximum value Xmax contained in the print location information;
   means for determining a Y-axis lower limit Ys that adds a top margin value Mt contained in the margin information to a Y-axis minimum value Ymin contained in the print location information, and means for determining a Y-axis upper limit Ye that subtracts a bottom margin value Mb contained in the margin information from an Y-axis maximum value Ymax contained in the print location information;
   means for comparing the X-axis lower limit Xs with the X-axis upper limit Xe and means for comparing the Y-axis upper limit Ye with the Y-axis lower limit Ys, respectively;
   means for selectively changing the margins respectively according to a predetermined rule when any of the X-axis lower limit Xs is greater than or equal to the X-axis upper limit Xe and the Y-axis lower limit Ys is greater than or equal to the Y-axis upper limit Ye; and
   means for determining the X-axis lower limit Xs and the Y-axis lower limit Ys as the respective X-axis and Y-axis coordinate values of a print starting point Xst, Yst when the X-axis lower limit Xs is less than the X-axis upper limit Xe and when the Y-axis lower limit Ys is less than the Y-axis upper limit Ye, and when the X-axis lower limit Xs is greater than or equal to X-axis upper limit Xe, means for determining an X-axis coordinate value Xst of the print starting point that adds the X-axis minimum value Xmin to a changed left margin value Ml' determined by the means for selectively changing the margins, and when the Y-axis lower limit Ys is greater than or equal to the Y-axis upper limit Ye, means for determining a Y-axis coordinate value Yst of the print starting point that adds the Y-axis minimum value Ymin to a changed top margin value Mt' determined by the means for selectively changing the margins.

24. The apparatus of claim 23, wherein, when any of the X-axis lower limit Xs is greater than or equal to the X-axis upper limit Xe and the Y-axis lower limit Ys is greater than or equal to the Y-axis upper limit Ye, the margins are initialized to a zero position according to a predetermined rule.

25. An apparatus for adjusting a print location for printing by a printer, comprising:
   means for receiving print location information about a print location for printing on a printing medium by the printer and margin information about margins for printing on a printing medium from a computer;
   means for determining the print location for printing on the printing medium using the print location information and the margin information; and
   means for controlling the position of a printer head for printing on the printing medium according to the print location determined by the means for determining the print location;
   wherein the means for determining the print location comprises:
      means for determining an X-axis lower limit Xs that adds a left margin value Ml contained in the margin information to an X-axis minimum value Xmin contained in the print location information, and means for determining an X-axis upper limit Xe that subtracts a right margin value Mr contained in the margin information from an X-axis maximum value Xmax contained in the print location information;
      means for determining a Y-axis lower limit Ys that adds a top margin value Mt contained in the margin information to a Y-axis minimum value Ymin contained in the print location information, and means for determining a Y-axis upper limit Ye that subtracts a bottom margin value Mb contained in the margin information from an Y-axis maximum value Ymax contained in the print location information;

means for comparing the X-axis lower limit Xs with the X-axis upper limit Xe and means for comparing the Y-axis upper limit Ye with the Y-axis lower limit Ys, respectively;

means for selectively changing the margins respectively according to a predetermined rule when any of the X-axis lower limit Xs is greater than or equal to the X-axis upper limit Xe and the Y-axis lower limit Ys is greater than or equal to the Y-axis upper limit Ye; and means for determining the X-axis lower limit Xs and the Y-axis lower limit Ys as the respective X-axis and Y-axis coordinate values of a print starting point Xst, Yst when the X-axis lower limit Xs is less than the X-axis upper limit Xe and when the Y-axis lower limit Ys is less than the Y-axis upper limit Ye, and when the X-axis lower limit Xs is greater than or equal to the X-axis upper limit Xe, means for determining an X-axis coordinate value Xst of the print starting point that adds the X-axis minimum value Xmin to a changed left margin value Ml' determined by the means for selectively changing the margins, and when the Y-axis lower limit Ys is greater than or equal to the Y-axis upper limit Ye, means for determining a Y-axis coordinate value Yst of the print starting point that adds the Y-axis minimum value Ymin to a changed top margin value Mt' determined by the means for selectively changing the margins.

26. The apparatus of claim 25, wherein, when any of the X-axis lower limit Xs is greater than or equal to the X-axis upper limit Xe and the Y-axis lower limit Ys is greater than or equal to the Y-axis upper limit Ye, the margins are initialized to a zero position according to a predetermined rule.

* * * * *